Patented Jan. 16, 1923.

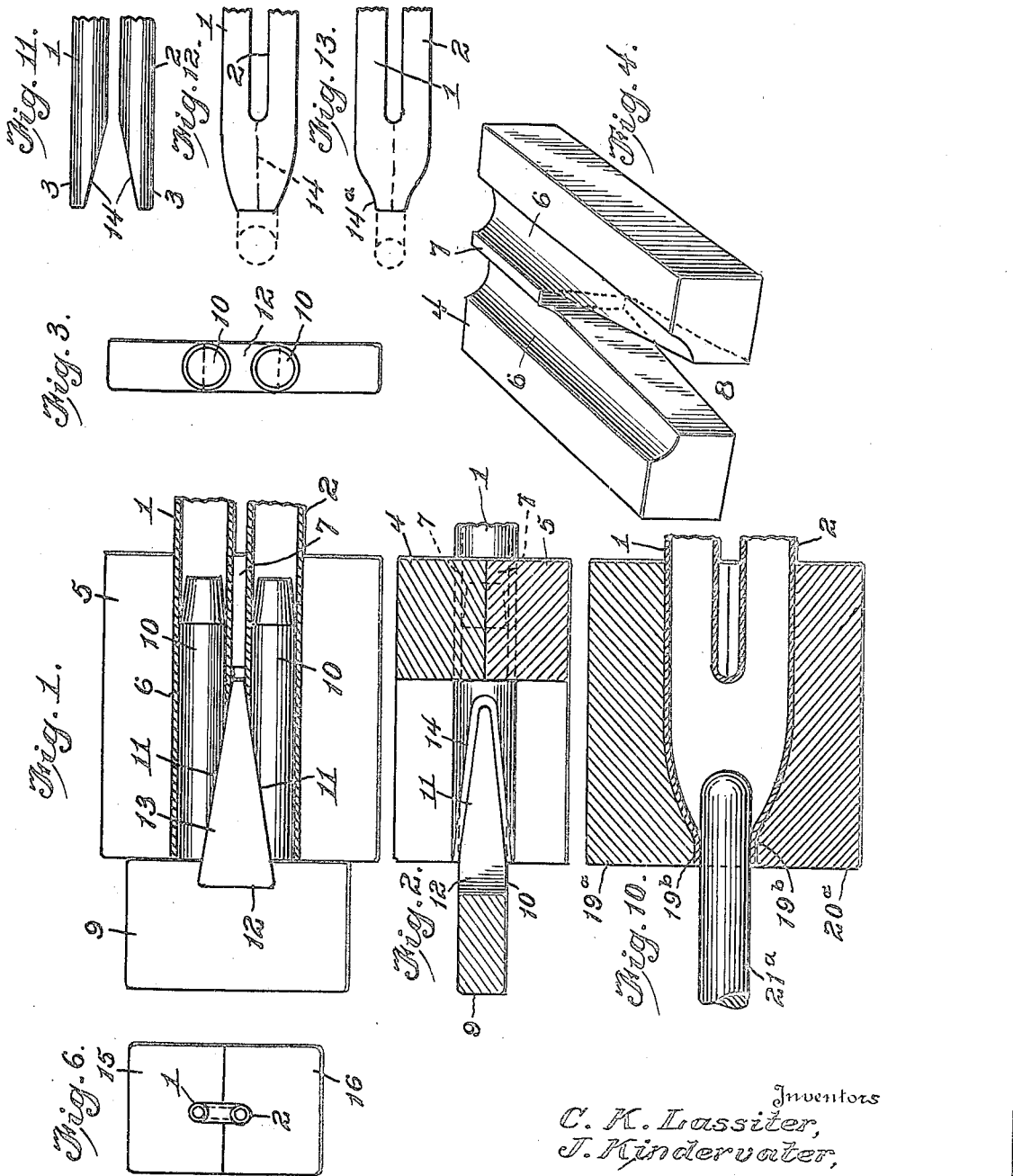

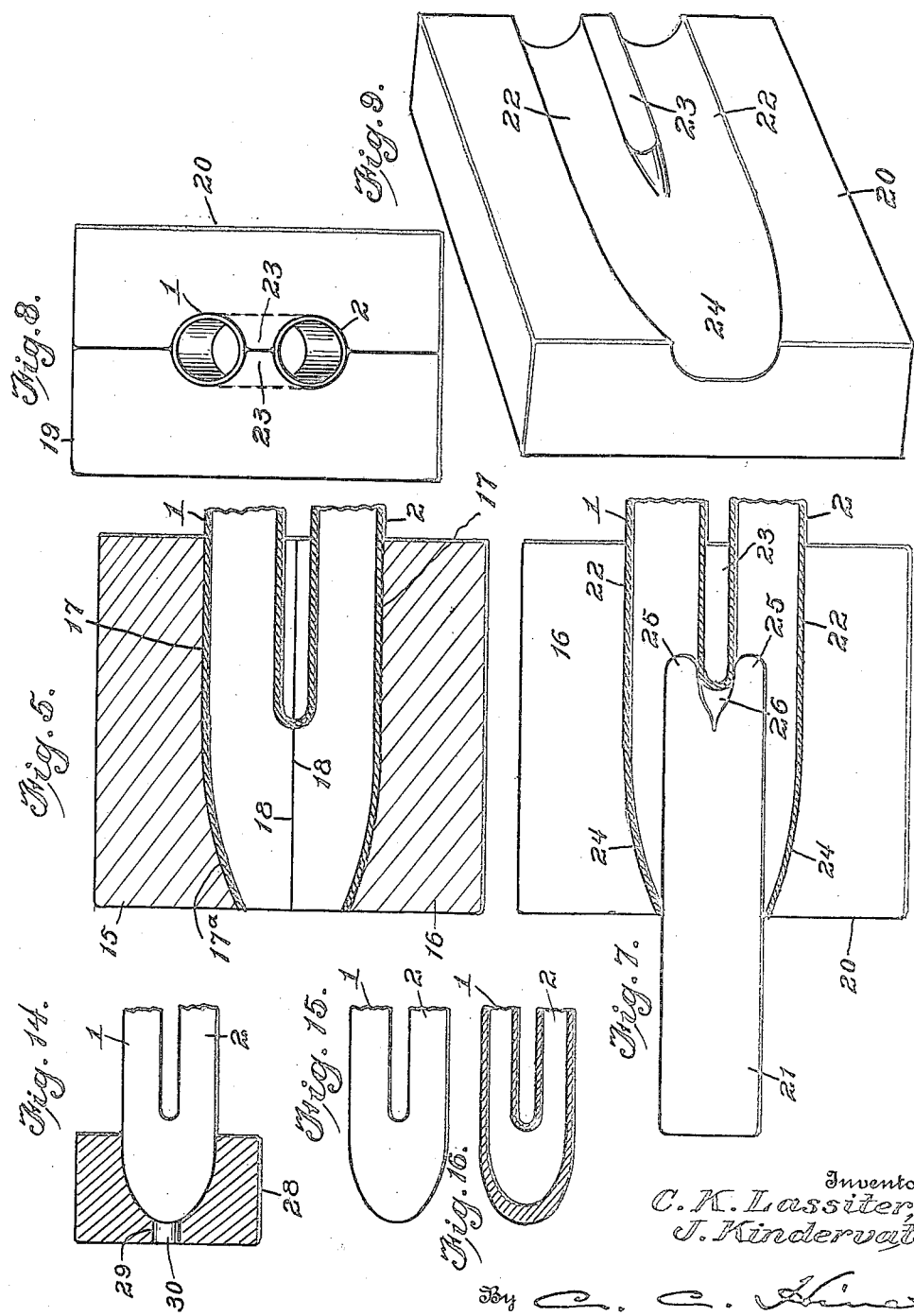

1,442,481

UNITED STATES PATENT OFFICE.

COLUMBUS K. LASSITER AND JULIUS KINDERVATER, OF NEW YORK, N. Y.

DEVICE FOR MAKING PIPE BENDS.

Application filed August 2, 1921. Serial No. 489,295.

*To all whom it may concern:*

Be it known that we, COLUMBUS K. LASSITER and JULIUS KINDERVATER, citizens of the United States, residing at New York, in the county of New York and State of New York, have jointly invented a certain new and useful Improvement in Devices for Making Pipe Bends, of which improvement the following is a specification.

Our invention relates to devices for making what are commonly known as return bends, for use in various conducting systems, including superheater elements for smoke-tube superheaters. More particularly our invention relates to devices for making a return bend which is integral with the pipes, and which is formed by forging and welding from portions of the pipe ends themselves.

In an application for patent, Ser. No. 489,009, executed and filed of even dates herewith, we have disclosed a novel method of making pipe bends of this type, whereby certain desirable and important advantages are gained over prior methods of manufacture. The present invention relates to devices primarily designed for use in carrying out the method of said application Ser. No. 489,009, although it is to be understood that we do not limit the invention in this connection, as we reserve the right to use such devices, jointly or singly, in any other methods or analogous operations for which they may be adapted.

In one prior method of making a return bend of the character described, the ends of the pipes are first longitudinally slitted and similar U-shaped half-sections of an incomplete bend are then formed by spreading the pipe walls on each side of the slits outwardly, after which the companion matching longitudinal edges of the spread walls, at the opposed open sides of the U-shaped half-sections, are caused to abut and are welded together. This produces an incomplete bend of elliptical shape and of like dimensions throughout in cross-section, which must be preliminarily contracted and reduced to a cross-sectionally circular form at its open end, before such open end can be tapered down and closed by swaging and welding in the usual way. These steps of splitting, spreading, and welding are generally performed in rapid succession, and as a single continuous operation, while the pipe ends are at a first welding heat. An objection to this process is that, owing to the comparatively large size of the open end of the bend, and, consequently, the amount of reduction, number of hammer blows required, and time consumed in preliminary shaping such open end of the bend for the closing operation, a reheating of the bend for such shaping operation is necessary. Furthermore, this operation of shaping or changing the contour of the open end of the bend to such a large degree, produces a very pronounced bulging of certain walls of the bend which must be eliminated by a final shaping (flattening) operation. Our invention provides devices for use in a method which enables the pipe walls to be joined with accuracy and precision, without resorting to any spreading operations to secure a proper shape and cross-sectional area of the incomplete bend. Our invention also provides devices for the manufacture of an incomplete bend which closely approaches the shape of the completed bend; i. e., which tapers from an elliptical to a circular form at its outer end. As a result, any preliminary shaping of the open end of the bend, which may be necessary preparatory to its closure, is reduced to the minimum, with a consequent reduction in the bulging of the bend walls and in the amount of the final flattening operation. As, also, such shaping may be easily and quickly performed, no special or additional heating of the bend for this purpose is required, as the shaping may be performed during the time period while the just-formed incomplete bend is still sufficiently hot, and by the same heat with which the first weld is made.

In another prior method of making pipe bends of the character described, the pipes are first longitudinally slitted, and then, by means of a special tool, the walls of each pipe on opposite sides of the slit are spread, so as to change the original circular cross-section of the pipe end into a U-shaped section, and to round out and concave the wall at the crotch portion or bottom of the slit. Then, by means of another special tool, the end of each pipe is bent or curved at right angles to the pipe axis, the ends of the pipes are then squared off parallel with the pipe axes, to form abutment faces, and such abutment faces are autogenously welded, to connect the bend sections thus formed and complete the bend. The disadvantage of this process is that it does not permit of the production of a bend of conventional tapered form; does not permit of a forged weld being obtained or one free from constricting fins or flashes; and does not admit of expeditious manufacture by forging and welding actions, along lines found to be most desirable and as furnishing bends of a most efficient and durable type. Our invention provides devices for carrying into practice a method which overcomes these disadvantages and furnishes a way of cheaply and expeditiously making a highly satisfactory form of bend by forging and welding.

One object of the present invention is to provide devices for making a forged and welded bend from the pipe ends, whereby a method of operation may be pursued which obviates the necessity of slitting, and thereafter spreading or stretching, the metal of the pipe ends, in order to form the half-bends or bend-sections which are to be joined.

Another object of the invention is to provide devices whereby one or more of the finishing steps employed in prior methods to give final shape to the bend may be entirely, or practically, eliminated.

Still another object of the invention is to provide devices for making an incomplete bend properly tapering toward its open end, and having an open end of circular contour, thus avoiding the necessity of varying the shape of such open end from elliptical to circular contour, as a preparatory step to the operations of closing the same by swaging and welding.

Still another object of the invention is to provide devices whereby a bend of highly satisfactory and durable type may be cheaply and expeditiously made, in accordance with a simplified method of manufacture.

The invention will be readily understood from the following description taken in connection with the accompanying drawings, in which:—

Figure 1 is a plan view of the lower half of a shear-die, a mandrel, and a shear blade, adapted for the practice of our invention, as arranged for the first action upon a pair of pipe ends, the said pipe ends appearing in section.

Figure 2 is a section taken on line 2—2 of Figure 1, omitting the shear blade.

Figure 3 is an end view of the mandrel.

Figure 4 is a perspective view of one of the shear-die sections.

Figure 5 is a vertical section through the bending die and pipe ends, showing the latter bent to form the half-sections of the return bend.

Figure 6 is an end elevation of the die shown in Figure 5.

Figure 7 is a horizontal section through the incomplete bend, as formed by the welding die and mandrel, the lower half of the die and the mandrel appearing in plan.

Figure 8 is an end elevation of the welding die.

Figure 9 is a perspective view of one of the sections thereof.

Figure 10 is a view showing a preliminary bend-closing step.

Figures 11, 12, 13, 14 and 15 are views illustrating the steps of manufacture of the return bend.

Figure 16 is a sectional view through the completed return bend.

The improvement constituting our invention is embodied in the bend making devices shown particularly in Figures 1 to 9, inclusive, parts of said figures, and the remaining figures and the description pertaining to them, being inserted largely in order that the modus operandi of the devices, and the character of the bend produced thereby, may be fully and clearly understood.

In the practice of our invention, two pipes, 1, 2, which are to be united by a return bend, are arranged in parallel relation, with the extremities of their ends 3 squared and in transverse alinement, and said pipe ends are clamped between two similar halves 4, 5, of a clamping or shear-die. Each of these die members 4, 5, comprises a block having parallel grooves 6, of semi-circular form at one end, the said semi-circular end portions of the grooves, which open through one end of the block, being separated by a partition wall 7. Between this wall 7 and the opposite end of the block, an inclined faced slot 8 is formed, extending from top to bottom of the block, the side walls of said slot extending divergently from the inner end of the wall 7, and progressively diminishing the diameter of the grooves toward the end of the block further therefrom. The die members 4 and 5 are designed to be securely clamped together, to firmly hold the pipe ends for a shearing action, and the pipes are also preferably clamped together, outside of the dies, to hold them in fixed relation. and suitable stops are also preferably provided to hold the connected pipes against endwise motion. When the die members 4 and 5 are brought together, to clamp the pipe ends 1 and 2, the slots 8 therein register with each other, and form a guide passage, into which portions of the adjacent sides of the pipe project beyond the line of the diverging inner walls of the slots.

For use in conjunction with the die members 4 and 5, a backing die or mandrel is provided, comprising a block or head 9, having a pair of mandrel legs 10, extending therefrom in parallel relation. The head 9 is designed to abut against one end of the clamping or shear-die members 4, 5, and the legs 10, of the mandrel, are designed to be inserted into the pipe ends so as to extend thereinto for a distance greater than the length of the slots 8, said mandrel legs serving to back or firmly support and reinforce the pipes while they are being cut or sheared, as hereinafter described. The inner sides of the mandrel legs 10 have portions 11, cut off at an angle conforming to and alining with the diverging walls of the slots 8, which slots 8 communicate with a slot 12, extending vertically through the inner face of the mandrel head 9. When the parts are assembled, and the pipe ends clamped in position, as shown in Figures 1 and 2, the slots 8 and 12 will provide a vertical guideway for the downward passage of a wedge-shaped cutter or shear blade 13, which may be power-operated in any suitable manner. On its down stroke, this shear blade cuts or shears off those portions of the inner sides of the pipe ends 1 and 2 which project into the guideway beyond the line of the obliquely disposed walls of the slots 8 and portions 11 of the mandrel legs 10, thus cutting away correspondingly shaped segmental portions from the pipes on oblique lines toward their extremities 3. The obliquity of these cuts may vary as required, or as may be found best suitable for service under different conditions, but in practice the end of each pipe is preferably sheared off at a middle point at its extremity, i. e., beginning at about one-half its full diameter, gradually extending outwardly, on decreased lines of development, until the full diameter is reached at the inner end of the cut.

The pipes are then released from the shear-die and mandrel and placed between the sections, 15 and 16, of a bending or primary swaging die, adapted to be used in any suitable forging machine. The members, 15 and 16, of this bending or primary forging die, are divided on a horizontal transverse plane, and the opposed races of said die members are provided with forming grooves or channels, 17 and 17ª. The grooves 17 are substantially semi-circular and form bores corresponding to the full pipe diameters, to receive and hold those uncut portions of the pipe ends lying immediately behind the cut portions 14, while the grooves 17ª cooperate to provide a forming cavity, communicating with the inner ends of said grooves 17, to receive and impart a prescribed form, to the said cut portion of the pipes. As shown, the cavity formed by the grooves 17ª is of elliptical cross-section at its inner end, or on that side of its transverse center which intersects the grooves 17, and thence gradually tapers, and varies from elliptical to circular cross-sectional form at its outer end, such circular end of the cavity formed by grooves 17ª being of a contracted diameter corresponding substantially to the intended final diameter of the open end of the incomplete bend to be formed. Before being placed between the die members, 15 and 16, the pipe ends are raised to welding heat, after which the normally open or spaced die members, 15 and 16, are gradually brought together under hammer blows or pressure, in a forging press or the like, until they are fully closed and their meeting faces abut. As a result of this forging action, the sheared portions of the pipe ends 1 and 2 will be bent or swaged laterally or inwardly toward each other, so that their open sides, formed by the cuts 14, will be brought into approximate relation, and the mating oblique edges of their walls brought into substantial alinement, and also substantially in parallel relation to each other and to the axes of the pipes, in readiness to be welded together, to integrally unite the two half-sections of the bend thus formed, and thereby effect the production of an incomplete bend, uniting the pipes and forming a cross channel between the bores thereof. It will be observed that, in the operation above described, the sheared portions of the pipe ends are bent inwardly on elliptical arcs, of a degree conforming substantially to the degree of obliquity of the sheared portions of the pipes, or are so bent, according to the line of the shear cuts 14, as to bring the edge walls 18, at the completion of the bend, into abutting relation, or in such close relation that they may be, in the succeeding operation or step of the method, welded securely together, to make a strong and durable joint.

At the completion of the bending operation just described, the die sections, 15 and 16, are opened and the pipe ends removed therefrom and again heated to welding heat, after which they are placed between the members, 19 and 20, of a welding die employed, in conjunction with a welding mandrel 21 to weld the surfaces 18 together. As shown particularly in Figures 7, 8 and 9, the die members, 19 and 20, are divided on a vertical plane, and each die member comprises a block, provided, at one end of its inner or abutment face, with a pair of semi-circular grooves 22, separated by an intermediate partition wall 23, and provided, at its opposite end, with a transversely continuous tapering groove 24. The grooves 22, of the die sections 19, 20, form circular channels similar to the grooves 17, of the die sections 15, 16, to receive the uncut portions of the pipes lying behind and adjacent to the formed half-bend sections to be joined, while the grooves 24, of the die members 19, 20, provide a forming cavity, similar to the cavity formed by the grooves 17ª of the dies 15, 16, to receive such half-sections of the bend, said cavity 24 being cross-sectionally of elliptical form, at its inner end, and gradually tapering to a contracted circular form at its outer end. The mandrel 21 is adapted to be inserted through the reduced end of the cavity 24, between the bent portions of the pipe sections, and comprises a body of proper form for cooperation with the die members 19, 20 to weld together the surfaces of the bend sections which are to be joined, and to impart a smooth internal finish thereto, free from fins or flashes, as well as to act as a forming surface of prescribed diameter, at a point to give proper form and size to the contracted circular end of the incomplete bend. Such mandrel has a crotch portion and welding end, comprising a pair of prongs or forks 25, between the inner portions of which extend inclined crotch forming surfaces 26. The parts being assembled as just described, with the pipe ends at welding heat, the die members 19, 20, which are normally in open or spaced position, are gradually forced together, under hammer blows or pressure, as in a forging press, so as to force and weld the edges 18 together, the forked portion of the mandrel simultaneously serving to draw the inner ends of said edges 18 together and, acting in conjunction with the surfaces 26, to weld the pipe portions at and in the region of the crotch point, and to give proper shape or conformation to said crotch. It will be understood that in the welding operation referred to, the mandrel 21 may move longitudinally into working position, as the die elements 19 and 20 close, so that it will wipe along, and make the surfaces of, the joint between the edges 18, smooth and devoid of fins or flashes, and at the same time draw the crotch portions together, and give a perfect shape and welding finish to the joint at the crotch. The mandrel is then withdrawn, the die sections 19, 20, opened and the pipes removed therefrom, at which time the pipe ends will be connected by a return bend, which is complete in all respects, except for the final step of closure of its outer or cap end. This closure of the open or cap end of the bend may be effected by swaging and welding, in various ways.

Figure 11 shows the two pipe ends as cut off, preparatory to the formation, bending, and welding together of the half-bend sections formed therefrom, and Figure 12 shows the incomplete bend made according to our method. It will be observed by reference to Figure 12 that this incomplete bend differs notably from the incomplete bends produced by other methods in an important respect, to wit, that the bend, instead of being of elliptical form, and of like cross-sectional dimensions throughout, tapers from an elliptical cross-section at about its middle portion to a contracted circular cross-section at its outer end. The incomplete bend as thus produced, therefore, closely approximates, in form and dimensions, the form and dimensions which the completed bend may have, with proper reference to the production of a bend of conventional shape and of any given size. Obviously such an incomplete bend does not require any change in shape at its open end from elliptical to circular contour, as in the operation of forming the incomplete bend, its open end is given a circular contour, and no further shaping in this connection is required. Preparatory to the operation of closing the circular outer end of the bend, however, we may reduce such circular end down to a more restricted circular cross-section, as shown in Figure 13, to better adapt it for the operation of the chosen bend closing devices thereon. This operation of further reducing down or restricting the outer end of the bend may be performed in any suitable manner, as by subjecting the bend to the action of a pair of suitable dies 19ª and 20ª and a coacting mandrel 21ª. These dies, which may be generally similar in construction to the dies 15 and 16, and 19 and 20, are provided with suitable surfaces 19ᵇ, for coaction with the mandrel 21ª, to reduce the end of the bend to a substantially cylindrical bottle neck formation, as shown by the cylindrical projection 14ª in Figure 13. This shaping reduction is, as shown, comparatively slight, and requires but a comparatively small amount of time, and hence it is not necessary to reheat the bend for this operation after it is removed from the welding dies 19 and 20, as the bend will retain a sufficient amount of the first welding heat to enable this reducing operation to be performed.

The operation of closing the open or cap end of the bend may be effected by swaging or spinning and welding in various ways. As an example, the open end of the bend may be reheated to welding heat and inserted between the sections, 27 and 28, of a swaging die, which may be operated to gradually contract and close the outer end of the bend and weld the contracted wall surfaces together. In this operation, there is an excess of metal which must be taken care of, and the die sections are provided for this purpose with grooves, forming a clearance channel 29, communicating with the forming channel of the die, and which receives the excess metal, in the shape of a nub or solid cylindrical section 30, which may be trimmed off in any suitable manner, or, if the excess of metal is not too great, the nub may be upset or flattened against the tip of the bend to give increased thickness thereto, and to seal any possible crevice against leakage. However, instead of swaging and welding the open end of the complete bend between swaging and welding dies, as above described, the same operation may be performed by spinning down and closing and welding the surfaces between suitable spinning rolls or the like.

It is to be understood that while, in the foregoing description, we have set forth a step of reducing down and shaping the open end of the bend, as shown in Figures 10 and 13, preparatory to closing it, as shown in Figure 14, our method is not limited to this step, except as and when specified in the claims including said step, as, under some conditions, it is perhaps possible, on account of the form of the incomplete bend produced, to omit this step entirely, and to effect the closing of the open end of the incomplete bend, in the shape, or substantially in the shape, in which it is formed by the dies, 15 and 16, and 19 and 20, without resorting to any preparatory shaping treatment whatever.

In the mode of manufacture herein disclosed, and as particularly shown in Figure 5, the line of cut of the surfaces 14, and arc of curvature of the sheared portions of the pipe ends, may be such that the edge walls 18 may not be in exact parallel and abutting relation, at the end of the bending operation, but may be slightly spread in the region of the crotch portions. With this arrangement, the outer extremities of the edges 18 may have an arc of movement of an extent beyond the center line, while the inner extremities of said edges are still slightly spaced at the end of the operation. This will result in an upsetting and thickening of the metal, at the outer extremities of the edges 18, and the drawing together and welding of the spread portions of said edges, and the welding of the crotch portions by the final movement of the dies to closed position, and the action of the forked portions 24 of the mandrel; while, at the same time, the metal will be compacted along the lines of weld, and smoothed out by the mandrel to form a strong and perfect union entirely devoid of fins or excrescences. However, the line of obliquity of the cuts 14, and arc of curvature of the bends, may be such as to bring the edges 18 in exact alinement and welding contact, or, in the event that the edges 18 are spread in the region of the crotch, the form of the dies 19, 20, may be such as to give a slight inward offset to the body portions of the pipe adjacent to the bend, at the moment of weld, to bring all surfaces to be welded in firm and accurate welding engagement, or such offsetting may be imparted to the pipes prior to treatment.

When the pipe bend, made as above described, is completed, a bend is produced which is of a desired tapered form to split the currents of gases, and reduce resistance to the flow thereof; the cap wall of the bend is properly thickened to secure increased strength and durability; and the bend is otherwise, both in form and construction, made to effectually meet all service conditions in accordance with the best practice. An important advantage of our method, as compared with the first prior method referred to, is that it avoids spreading of the pipe walls and stretching of the metal in order to form a proper weld of the half sections of the bend and to make the bend of proper cross-sectional area. Furthermore, as stated, our method avoids the necessity of reducing the open end from a primary elliptical to a circular form, before closing and welding the same, as, by forming and bending the half sections in the manner described, they are simultaneously brought into proper relation for a welding connection, and given approximately the final form which the bend is to assume, the open end of the bend being given the desired circular contour without any auxiliary or additional shaping. Inasmuch, also, as the first operation of cutting away portions of the pipe ends removes practically all of the excess metal which is customarily trimmed off as a final step, the necessity of trimming off a large amount of metal is avoided, the small amount left, in the form of the nub 30, being all that is necessary to be trimmed off, and this may be upset, as described, to increase the thickness of the cap end and seal any possible crevice that might be left. By imparting to the incomplete bend substantially the form which the completed bend is to assume, objectionable bulging of walls from shaping operations is avoided, as will be readily understood. Hence the usual final operation of flattening may be eliminated, or the extent of any flattening operation which may be found necessary reduced to the minimum.

Our method is also materially advantageous over the second method of manufacture hereinbefore referred to, in that it does away with the use of special tools, and special steps requiring hand operations, and adapts the bend to be cheaply and expeditiously manufactured by forging along established lines, and produces a strongly welded bend, of a form found best adapted for the purpose, and which is entirely devoid of internal fins or flashes, and is provided with a cap wall which may be made of any desired thickness during the final closing and welding action, without the necessity of welding an additional thickness of metal thereon. Other advantages of our method of manufacture, flowing out of the use of our improved devices, will also be apparent to those versed in the art.

Having thus fully described our invention, we claim:

1. In the manufacture of pipe bends, the combination of a die for clamping two pipe ends in parallel relation, a mandrel provided with legs to enter the clamped pipe ends, said die and mandrel having surfaces forming a slotted guideway into which portions of the clamped pipe ends may project; and a cutter movable through said guideway for cutting off the projecting pipe portions said guideway and cutter being of a form to effect the cutting off of such projecting pipe portions at an angle to the axes of the pipes.

2. In the manufacture of pipe bends, the combination of a die for clamping two pipe ends in parallel relation; a mandrel having legs to enter the pipe ends, said die and mandrel legs having cooperating inclined surfaces forming a flaring guideway into which portions of the pipes project; and a cutter movable through said guideway for cutting off the projecting pipe portions at an angle to the pipe axes.

3. In the manufacture of pipe bends, the combination of a die for clamping two pipe ends in parallel relation, said die comprising two members grooved longitudinally to provide two circular pipe bores opening through one end thereof and separated by a partition, and a cavity intersecting the inner ends of said bores and extending toward the opposite end of the die, said die members having inclined faced slots, extending from bottom to top thereof and through said cavity and progressively diminishing the diameter of the cavity forming portions of the grooves, thereby providing an inclined faced guideway whose walls diverge from the partition toward the second-named end of the die and into which portions of the clamped pipe ends may project; a mandrel having legs to enter the clamped pipe ends and shaped to leave unoccupied thereby the portions of the pipe ends which project into the guideway; and a wedge-shaped cutter movable through said guideway to cut away the said projecting portions of the pipes at an angle to the pipe axes.

4. In means for making pipe bends, a die for forming complemental inchoate bend sections from two pipes having end portions with surfaces cut away at an angle to their axes, said die comprising relatively movable members having surfaces adapted to receive and hold from bending movement uncut portions of said pipes lying adjacent to and in rear of their cut portions, and having surfaces shaped to receive the cut portions of the pipes, the latter-named surfaces being operative, on the relative inward movement of said die members, to bend the cut portions of the pipes laterally and inwardly towards each other, so as to bring the marginal walls of the cut away portions substantially into abutting relation.

5. In means for making pipe bends, a die for forming complemental inchoate bend sections from two pipe ends having opposed surfaces to be welded, formed by cutting away portions of the pipes at an oblique angle to the pipe axes, said die comprising two relatively movable members having holding surfaces to receive and hold from bending movement uncut portions of said pipe ends lying adjacent to and in rear of their cut portions, said die members also having shaping surfaces forming a cavity of elliptical form at one end and tapering continuously therefrom to a circular form at its opposite end, said shaping surfaces being adapted to receive the cut portions of the pipes and operative, on a relative closing motion of the die members, for shaping said cut portions of the pipes to conform to the contour of the cavity and for simultaneously bending the cut portions of the pipes inwardly towards each other at oblique angles reversely conforming to their oblique lines of cut, so as to bring the walls of said obliquely cut portions into approximate and substantially parallel relationship.

6. In means for making pipe bends, a die for forming complemental inchoate bend sections from two pipe ends having surfaces formed by cutting away portions of the pipe ends at an angle to their axes, said die comprising members having bores to receive and hold from bending movement uncut portions of the pipes lying in rear of and adjacent to their cut portions, and a shaping cavity to receive the cut portions of the pipes, said shaping cavity having surfaces adapted, on a relative inward closing movement of the die members, to bend the cut portions of the pipes inwardly towards each other, on elliptical arcs of a degree to bring the inclined surfaces of the pipes into substantially abutting relation.

7. In means for making pipe bends, a die for making complemental sections of an inchoate bend from two pipe ends having opposed surfaces to be welded formed by cutting away portions of the pipes at an oblique angle to the pipe axes, said die comprising two relatively movable members having spaced bores to receive and hold from bending movement uncut portions of said pipe ends lying adjacent to and in rear of their cut portions, and also having surfaces operative, on a relative closing motion of said die members, for bending the cut away portions of the pipes towards each other on oblique arcs, of a degree conforming substantially to the angularity of said obliquely cut away portions of the pipes, so as to bring said surfaces into approximate and substantially parallel relationship.

8. In means for making pipe bends, a die element for making a half-section of an incomplete bend from a pipe end having one of its sides longitudinally cut away at an oblique angle to its axis, said die element having a surface formed to receive and hold from bending movement an uncut portion of said pipe end lying in rear of its cut portion, and having in advance of said surface a second surface to receive the cut portion of the pipe, the said second surface being operative, on a movement of said die, to bend said pipe end laterally in the direction of its cut away side at an angle to dispose the walls of the cut substantially parallel with the axis of the pipe.

9. A die for forming incomplete bend sections from two pipes having obliquely cut away side portions lying in advance of adjacent uncut portions, said die comprising relatively movable members having surfaces to engage and bend said cut portions of the pipes laterally towards each other, and means to engage and prevent said uncut portions of the pipes from being bent towards each other during the bending movements of said cut portions.

10. In means for making pipe bends, a die element for making a half-section of an incomplete bend from a pipe end having one of its sides longitudinally cut away at an oblique angle to its axis, said die element having a grooved portion to engage and hold from bending movement an uncut portion of said pipe end lying adjacent to and in rear of its cut portion, and having a shaping surface tapering from a semi-elliptical form at one end to a semi-circular form at its opposite end to receive and act upon said cut portion of the pipe, said shaping surface being operative, on a relative lateral movement of said die element, in the direction of the cut away side of said pipe end, to bend the cut away portion of the pipe end at such an angle as to dispose the walls of said cut away portion substantially parallel with the pipe axis and to simultaneously impart to said bent pipe portion a shape corresponding to that of said shaping surface, whereby a resulting half-bend section will be produced which is of substantially semi-elliptical form at its inner end and tapers continuously to a substantially semi-circular form at its outer end.

11. In means for making pipe bends, a die comprising relatively movable sections having opposed grooves shaped to provide a cavity of substantially elliptical form at one end and thence tapering to a reduced substantially circular form at its opposite end, said circular end of the cavity opening directly through one face of the die, the taper of said cavity being continuous from its substantially elliptical end to the point of emergence of its substantially circular end through the said face of the die.

12. In means for making pipe bends, a die for acting upon complemental bend sections, said die comprising two relatively movable die members having grooves forming two separated pipe receiving bores opening through one end of the die, and grooves forming a shaping cavity communicating at its inner end with said bores and opening at its outer end through the opposite end of the die, said cavity being of substantially elliptical form at its inner end and thence tapering continuously to a reduced substantially circular form at its outer end coincident with its point of emergence through the end of the die.

13. In means for making pipe bends, a die comprising relatively movable members for making two complemental half-sections of an incomplete bend from two parallel pipe ends, having their adjacent sides longitudinally cut away at oblique angles to their axes, said die members having grooves separated by a partition and forming bores shaped to receive and hold from bending movement uncut portions of said pipe ends lying adjacent to and in rear of their cut portions, and having grooves forming a cavity to receive the said cut portions of the pipes, the walls of said grooves providing shaping surfaces of a form operative, on a movement of said die members toward each other, to bend the cut portions of the pipe ends toward each other at such an angle as to dispose the walls of said cut portions substantially in abutting relation and parallel with the pipe axes, whereby the cut portions will be shaped to produce half-bend sections each of substantially semi-elliptical form at its inner end and tapering to a substantially semi-circular form at its outer end.

14. Means for welding the opposing walls and crotch-forming portions of the open sides of two complemental half-bend sections together, each of said sections being cross-sectionally of substantially semi-elliptical form at its inner end and thence tapering to a substantially semi-circular form at its outer end, said means comprising a die composed of two relatively movable die members and having two pipe receiving bores opening through one end of said die and communicating at their inner ends with a cavity opening through the opposite end of the die, said cavity being of substantially elliptical form at its inner end and thence disposed between the half-bend sections and having a crotch-forming surface and a surface to give a finished substantially circular shape to the open end of the complete bend formed by the welding action.

15. In means for making pipe bends, a die for acting upon complemental bend sections, said die comprising two relatively movable members each in the form of a block, opposed faces of said blocks being provided with complemental grooves and partition walls forming pipe receiving bores opening through one end of the block, and said faces also having complemental grooves forming a cavity communicating at its inner end with said bores and opening at its outer end through the opposite end of the die, said cavity being cross-sectionally of elliptical form at its inner end and thence tapering tapering to a substantially circular form at its outer end, and a mandrel adapted to be to a cross-sectional circular form at its outer end.

16. In means for making pipe bends, the combination of a swaging die comprising relatively movable members and having pipe receiving bores and an inchoate bend receiving cavity, said cavity being of elliptical cross-section at its inner end and thence tapering to a contracted circular cross-section at its outer end to receive an inchoate bend of similar form, and said die members having surfaces for reducing the outer end of the bend to a substantially bottle-neck form, and a mandrel for cooperation with said surfaces to shape the outer end of the incomplete bend as described.

In testimony whereof we affix our signatures.

COLUMBUS K. LASSiTER.
JULIUS KINDERVATER.